US007797741B2

(12) United States Patent
Kim et al.

(10) Patent No.: US 7,797,741 B2
(45) Date of Patent: Sep. 14, 2010

(54) SYSTEM AND METHOD FOR COPING WITH ENCRYPTED HARMFUL TRAFFIC IN HYBRID IPV4/IPV6 NETWORKS

(75) Inventors: Myung Eun Kim, Daejeon (KR); Hwan Kuk Kim, Seoul (KR); Dong Il Seo, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 1016 days.

(21) Appl. No.: 11/238,300

(22) Filed: Sep. 29, 2005

(65) Prior Publication Data

US 2006/0137011 A1    Jun. 22, 2006

(30) Foreign Application Priority Data

Dec. 16, 2004  (KR) .................. 10-2004-0107223

(51) Int. Cl.
*G06F 21/20* (2006.01)
*H04L 29/00* (2006.01)
*H04L 29/08* (2006.01)

(52) U.S. Cl. .................. 726/22; 709/224; 709/225; 709/232; 709/238; 713/150; 713/151; 713/153; 713/154

(58) Field of Classification Search .................. 726/11, 726/12, 13, 14, 15, 22, 23, 27; 709/218, 709/219, 224, 225, 223, 229, 231; 380/259, 380/37, 42, 278, 279; 713/150, 151, 153, 713/154, 160, 161, 162, 168, 170
See application file for complete search history.

(56) References Cited

U.S. PATENT DOCUMENTS 6,038,233 A * 3/2000 Hamamoto et al. ......... 370/401
6,775,657 B1 * 8/2004 Baker ........................ 706/45
7,116,681 B1 * 10/2006 Hovell et al. ............... 370/466
2001/0009025 A1 * 7/2001 Ahonen ...................... 713/161
2002/0069278 A1 * 6/2002 Forslow ..................... 709/225
2002/0069356 A1 * 6/2002 Kim .......................... 713/160
2002/0188871 A1 * 12/2002 Noehring et al. ........... 713/201
2005/0160183 A1 * 7/2005 Valli et al. .................. 709/245

FOREIGN PATENT DOCUMENTS

KR    20020088956    11/2002

* cited by examiner

*Primary Examiner*—Taghi T Arani
*Assistant Examiner*—Kenneth Chang
(74) *Attorney, Agent, or Firm*—Ladas & Parry LLP

(57) ABSTRACT

Provided are a system and method for coping with encrypted harmful traffic in hybrid IPv4/IPv6 networks. The system includes: an encryption key manager collecting encryption key information from a user terminal connected to the hybrid IPv4/IPv6 networks, and storing and managing the information in an encryption key database; an encryption traffic collector collecting encrypted traffic from traffic in the hybrid IPv4/IPv6 networks; an encryption key searcher searching for an encryption key used to decrypt the encrypted traffic from the encryption key database using a source IP address and a destination IP address of the encrypted traffic; a harmful traffic determiner decrypting the encrypted traffic using the encryption key and determining whether the decrypted traffic is harmful traffic; and an encryption traffic processor, if the decrypted traffic is determined to be harmful traffic, blocking the harmful traffic and, if the decrypted traffic is determined to be normal traffic, encrypting the normal traffic, and transferring the encrypted traffic to a user terminal corresponding to the destination IP address, thereby detecting and blocking an attack pattern using the encrypted harmful traffic in hybrid IPv4/IPv6 networks which cannot be detected by a conventional firewall system and more effectively protecting the networks.

6 Claims, 3 Drawing Sheets

SYSTEM AND METHOD FOR COPING WITH ENCRYPTED HARMFUL TRAFFIC IN HYBRID IPV4/IPV6 NETWORKS

BACKGROUND OF THE INVENTION

This application claims the benefit of Korean Patent Application No. 10-2004-0107223, filed on Dec. 16, 2004, in the Korean Intellectual Property Office, the disclosure of which is incorporated herein in its entirety by reference.

1. Field of the Invention

The present invention relates to network security, and more particularly, to a system and method for detecting and coping with attacks in hybrid IPv4/IPv6 networks using end-to-end tunneling.

2. Description of the Related Art

In general, if contents of a packet header and a payload are identical to an attack pattern at a lead-in network point, harmful traffic in a network is blocked.

However, since it is impossible to examine contents of an encrypted packet without decrypting the encrypted packet, and compare the contents of the packet with the attack pattern, a firewall system generally bypasses the harmful traffic.

With the introduction of the IPv6 network layer standard, such a characteristic of the firewall system increases a likelihood of attack patterns using encrypted traffic. A typical attack pattern uses adverse tunneling, in which the tunneling is used for communication between IPv6 networks in hybrid IPv4/IPv6 networks. In adverse tunneling, an attacker in an IPv4 network disguised as a user of the IPv6 network attacks with harmful traffic that is encrypted using end-to-end tunneling.

Although a firewall system embedded with an IPv4/IPv6 dual stack has been released based on the introduction of the IPv6 network layer standard, technology for detecting harmful traffic that is encrypted using end-to-end tunneling has not yet been developed. Therefore, a mechanism for detecting and blocking harmful traffic is required to prevent encrypted harmful traffic in hybrid IPv4/IPv6 networks from intruding the networks

SUMMARY OF THE INVENTION

The present invention provides a system and method for detecting harmful traffic in advance in hybrid IPv4/IPv6 networks.

The present invention also provides a computer-readable recording medium storing the method.

According to an aspect of the present invention, there is provided a system for coping with encrypted harmful traffic in hybrid IPv4/IPv6 networks, the system comprising: an encryption key manager collecting encryption key information from a user terminal connected to the hybrid IPv4/IPv6 networks, and storing and managing the information in an encryption key database; an encryption traffic collector collecting encrypted traffic from traffic in the hybrid IPv4/IPv6 networks; an encryption key searcher searching for an encryption key used to decrypt the encrypted traffic from the encryption key database using a source IP address and a destination IP address of the encrypted traffic; a harmful traffic determiner decrypting the encrypted traffic using the encryption key and determining whether the decrypted traffic is harmful traffic; and an encryption traffic processor, if the decrypted traffic is determined to be harmful traffic, blocking the harmful traffic and, if the decrypted traffic is determined to be normal traffic, encrypting the normal traffic, and transferring the encrypted traffic to a user terminal corresponding to the destination IP address.

The traffic may be encrypted using end-to-end tunneling.

The encryption traffic collector may collect the encrypted traffic from traffic that flows into a network lead-in point at which an IPv6 network and an IPv4 network are connected to each other, and the encryption key manager may regularly collects the encryption key information.

According to another aspect of the present invention, there is provided a method of coping with encrypted harmful traffic in hybrid IPv4/IPv6 networks, the method comprising: (a) collecting encryption key information from a user terminal connected to the hybrid IPv4/IPv6 networks, and storing and managing the information in an encryption key database; (b) collecting encrypted traffic from traffic in the hybrid IPv4/IPv6 networks; (c) searching for an encryption key used to decrypt the encrypted traffic from the encryption key database using a source IP address and a destination IP address of the encrypted traffic; (d) decrypting the encrypted traffic using the encryption key and determining whether the decrypted traffic is harmful traffic; and (e) if the decrypted traffic is determined to be harmful traffic, blocking the harmful traffic and, if the decrypted traffic is determined to be normal traffic, encrypting the normal traffic, and transferring the encrypted traffic to a user terminal corresponding to the destination IP address.

According to still another aspect of the present invention, there is provided a computer readable medium having embodied thereon a computer program for a method of coping with encrypted harmful traffic in hybrid IPv4/IPv6 networks, the method comprising: (a) collecting encryption key information from a user terminal connected to the hybrid IPv4/IPv6 networks, and storing and managing the information in an encryption key database; (b) collecting encrypted traffic from traffic in the hybrid IPv4/IPv6 networks; (c) searching for an encryption key used to decrypt the encrypted traffic from the encryption key database using a source IP address and a destination IP address of the encrypted traffic; (d) decrypting the encrypted traffic using the encryption key and determining whether the decrypted traffic is harmful traffic; and (e) if the decrypted traffic is determined to be harmful traffic, blocking the harmful traffic and, if the decrypted traffic is determined to be normal traffic, encrypting the normal traffic, and transferring the encrypted traffic to a user terminal corresponding to the destination IP address.

BRIEF DESCRIPTION OF THE DRAWINGS

The above and other features and advantages of the present invention will become more apparent by describing in detail exemplary embodiments thereof with reference to the attached drawings in which.

DETAILED DESCRIPTION OF THE INVENTION

The present invention will now be described more fully with reference to the accompanying drawings, in which exemplary embodiments of the invention are illustrated.

Figure 1:
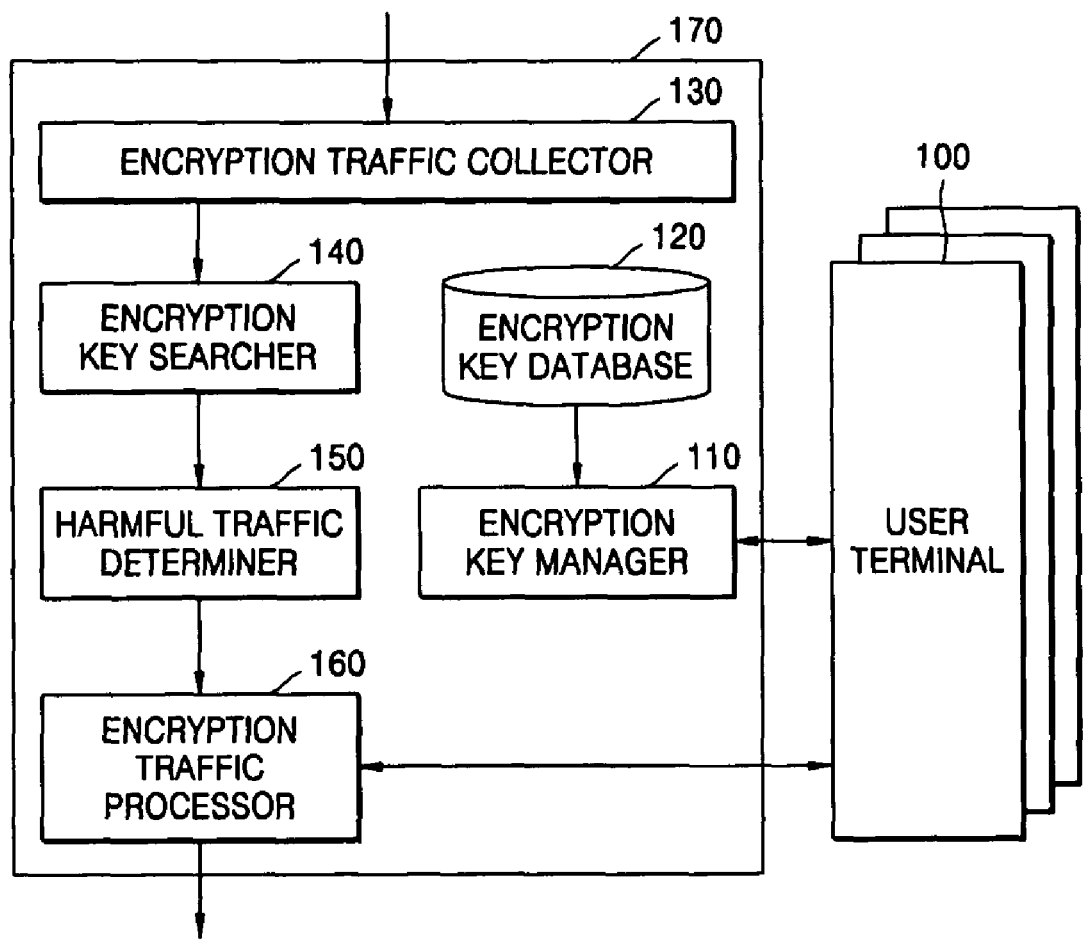
FIG. 1 is a block diagram of a system for coping with encrypted harmful traffic in hybrid. IPv4/IPv6 networks according to an embodiment of the present invention.

FIG. 1 is a block diagram of a system 170 for coping with encrypted harmful traffic in hybrid IPv4/IPv6 networks according to an embodiment of the present invention. Referring to FIG. 1, the system 170 includes an encryption key manager 110 that collects encryption key information from a user terminal 100 connected to the hybrid IPv4/IPv6 networks and stores and manages the information in an encryption key database 120, an encryption traffic collector 130 that collects encrypted traffic from traffic in the hybrid IPv4/IPv6 networks, an encryption key searcher 140 that searches for the encryption key used to decrypt the encrypted traffic from the encryption key database 120 using a source IP address and a destination IP address of the encrypted traffic, a harmful traffic determiner 150 that decrypts the encrypted traffic using the encryption key and determines whether the decrypted traffic is harmful traffic, and an encryption traffic processor 160 that, if the decrypted traffic is determined to be harmful traffic, blocks the harmful traffic and, if the decrypted traffic is determined to be normal traffic, encrypts the normal traffic, and transfers the encrypted traffic to a user terminal corresponding to the destination IP address.

Figure 2:
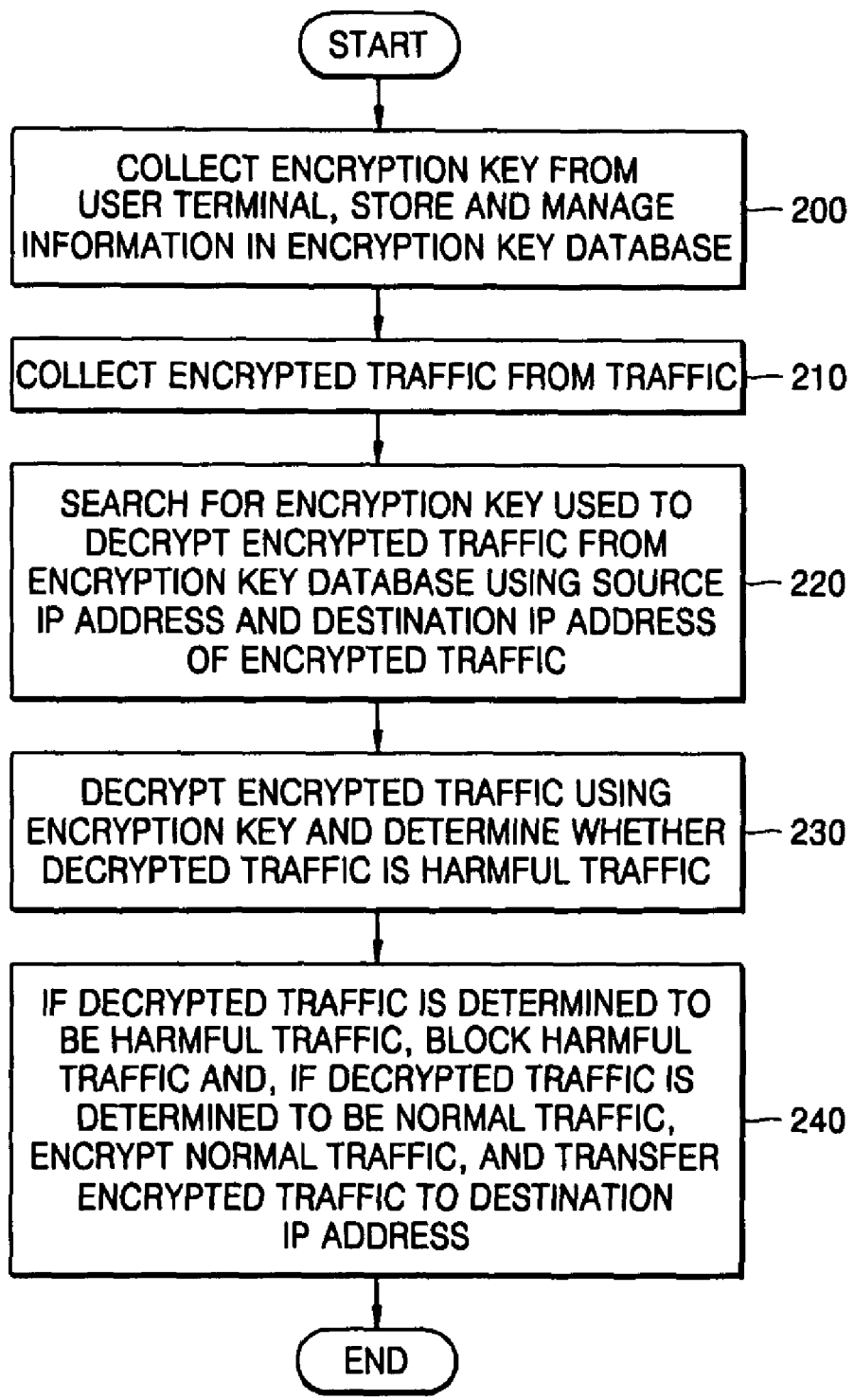
FIG. 2 is a flowchart illustrating a method of coping with encrypted harmful traffic in hybrid IPv4/IPv6 networks according to an embodiment of the present invention.

FIG. 2 is a flow chart illustrating a method of coping with encrypted harmful traffic in hybrid IPv4/IPv6 networks according to an embodiment of the present invention. Referring to FIG. 2, the method comprises collecting encryption key information from a user terminal connected to the hybrid IPv4/IPv6 networks and storing and managing the information in an encryption key database (Operation 200), collecting encrypted traffic from traffic in the hybrid IPv4/IPv6 networks (Operation 210), searching for an encryption key used to decrypt the encrypted traffic from the encryption key database using a source IP address and a destination IP address of the encrypted traffic (Operation 220), decrypting the encrypted traffic using the searched encryption key and determining whether the decrypted traffic is harmful traffic (Operation 230), and, if the decrypted traffic is determined to be harmful traffic, blocking the harmful traffic and, if the decrypted traffic is determined to be normal traffic, encrypting the normal traffic, and transferring the encrypted traffic to a user terminal corresponding to the destination IP address (Operation 240).

The traffic is encrypted using end-to-end tunneling, and the present invention is effectively applied to the encrypted traffic.

Figure 3:
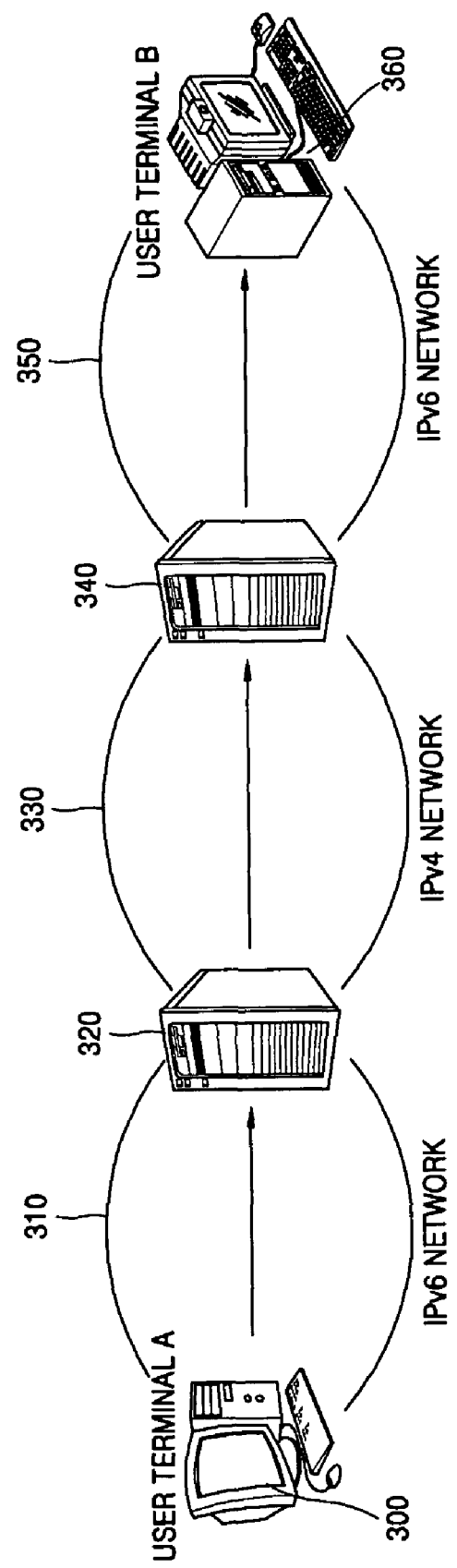
FIG. 3 illustrates hybrid IPv4/IPv6 networks including the system according to an embodiment of the present invention.

FIG. 3 illustrates hybrid IPv4/IPv6 networks including the system according to an embodiment of the present invention. Referring to FIG. 3, traffic flows from a user terminal A 300 to a user terminal B 360.

The encryption key manager 110 collects encryption key information from the user terminals A 300 and B 360 connected to the hybrid IPv4/IPv6 networks, stores the information in the encryption key database 120, and manages changes in the information (Operation 200). The encryption key manager 110 stores information about the user terminals A 300 and B 360. That is, the encryption key manager 110 stores and manages IP address of the user terminals A 300 and B 360 and the encryption keys of the user terminals A 300 and B 360.

Since the user terminals A 300 and B 360 can be removed from the hybrid IPv4/IPv6 networks or a new user terminal can be added to the hybrid IPv4/IPv6 networks, the encryption key manager 110 may collect the encryption key information on a regular basis.

The encryption traffic collector 130 collects encrypted traffic having an Ipsec header of a tunnel mode among traffic that flows into the hybrid IPv4/IPv6 networks (Operation 210).

An IPv6 network 310 and an IPv4 network 330 are connected to each other at a network lead-in point.

A network server 320 which makes it easy for different networks to be connected each other is at the network lead-in point. Traffic flowing into the network lead-in point at which the IPv6 network 310 and the IPv4 network 330 are connected each other may be managed. Likewise, traffic flowing into a network lead-in point 340 at which the IPv4 network 330 and an IPv6 network 350 are connected each other may be managed.

In the system of the present invention, encrypted traffics may be collected at the network lead-in points 320 or 340.

The encryption key searcher 140 extracts information on a source IP address and a destination IP address from the encrypted traffic and searches for an encryption key used to decrypt the encrypted traffic from the encryption key database 120 using the extracted IP address information (Operation 220).

The harmful traffic determiner 150 decrypts the encrypted traffic using the encryption key and determines whether the decrypted traffic is harmful traffic based on packet header information and payload content (Operation 230).

The encryption traffic processor 160, if the decrypted traffic is determined to be harmful traffic, blocks the harmful traffic, and, if the decrypted traffic is determined to be normal traffic, encrypts the normal traffic using the encryption key, and transfers the encrypted traffic to the user terminal corresponding to the destination IP address (Operation 240).

When the present invention is applied to the network lead-in point 340, traffic generated in the user terminal A 300 passes through the network lead-in point 320. If the traffic is not harmful traffic, the traffic is transferred to the user terminal B 360 via the IPv6 network 350. However, if the traffic is harmful traffic, the traffic is revoked at the network lead-in point 340.

The present invention can also be embodied as computer readable code on a computer readable recording medium. The computer readable recording medium is any data storage device that can store data which can be thereafter read by a computer system. Examples of the computer readable recording medium include read-only memory (ROM), random-access memory (RAM), CD-ROMs, magnetic tapes, floppy disks, and optical data storage devices. The computer readable recording medium can also be distributed network coupled computer systems so that the computer readable code is stored and executed in a distributed fashion.

The operations of the present invention can be realized on a hardware or software basis using a programming system which can be understood by those skilled in the art.

The system for coping with encrypted harmful traffic in hybrid IPv4/IPv6 networks comprises an encryption key manager that collects encryption key information from a user terminal connected to the hybrid IPv4/IPv6 networks and stores and manages the information in an encryption key database, an encryption traffic collector that collects encrypted traffic from traffic in the hybrid IPv4/IPv6 networks, an encryption key searcher that searches for the encryption key used to decrypt the encrypted traffic from the encryption key database using a source IP address and a destination IP address of the encrypted traffic, a harmful traffic determiner that decrypts the encrypted traffic using the encryption key and determines whether the decrypted traffic is harmful traffic, and an encryption traffic processor that, if the decrypted traffic is determined to be harmful traffic, blocks the harmful traffic and, if the decrypted traffic is determined to be normal traffic, encrypts the normal traffic, and transfers the encrypted traffic to the user terminal corresponding to the destination IP address, thereby detecting and blocking an attack pattern using the encrypted harmful traffic in hybrid IPv4/IPv6 networks which cannot be detected by a conventional firewall system and more effectively protecting the networks.

While the present invention has been particularly shown and described with reference to exemplary embodiments thereof, it will be understood by those of ordinary skill in the art that various changes in form and details may be made therein without departing from the spirit and scope of the present invention as defined by the following claims.

What is claimed is:

1. A system for coping with encrypted harmful traffic in hybrid IPv4/IPv6 networks, the system comprising:
   an encryption key manager collecting encryption key information by a microprocessor from at least one to a plurality computer user terminals connected to the hybrid IPv4/IPv6 networks, and storing and managing the encryption key information in an encryption key database;
   an encryption traffic collector collecting encrypted traffic from traffic in the hybrid IPv4/IPv6 networks,
   wherein the encryption traffic collector collects the encrypted traffic that flows from at least a first network lead-in point to a second lead-in point,
   wherein each of the first and second network lead-in points is located between a IPv4 network and a IPv6 network, and the first and second network lead-in points communicate through one of the IPv4 network and the IPv6 network,
   wherein the encrypted traffic has an IPsec header of an end-to-end tunnel mode traffic that flows into the hybrid IPv4/IPv6 networks, and
   wherein traffic flows from a first computer user terminal through the first lead-in point to the second lead-in point that a second computer user terminal is connected to for receiving traffic sent from the first computer user terminal, and
   wherein harmful traffic is sent from a third computer user terminal, which is directly connected to the IPv4 network;
   an encryption key searcher searching for an encryption key used to decrypt the encrypted traffic from the encryption key database using a source IP address and a destination IP address of the encrypted traffic;
   a harmful traffic determiner decrypting the encrypted traffic using the encryption key and determining whether the decrypted traffic is the harmful traffic; and
   an encryption traffic processor, if the decrypted traffic is determined to be the harmful traffic, blocking the harmful traffic and, if the decrypted traffic is determined to be normal traffic, encrypting the normal traffic, and transferring the encrypted traffic to the second computer user terminal corresponding to the destination IP address of the traffic being sent from the first computer user terminal,
   wherein the blocked harmful traffic is revoked at the second lead-in point or the first lead-in point from being encrypted to the normal traffic after the traffic from the first computer user terminal has passed through either the first lead-in point or the second lead-in point, and
   wherein the revoked harmful traffic is not transferred as encrypted traffic to the second computer user terminal corresponding to the destination IP address of the traffic being sent from the first computer user terminal.

2. The system of claim 1, wherein the collected encrypted traffic from the traffic in the hybrid IPv4/IPv6 networks is encrypted for use in the end-to-end tunnel mode traffic.

3. The system of claim 1, wherein the encryption key manager regularly collects the encryption key information.

4. A method of coping with encrypted harmful traffic in hybrid IPv4/IPv6 networks, the method comprising:
   collecting encryption key information by a microprocessor from at least one to a plurality of computer user terminals connected to the hybrid IPv4/IPv6 networks, and storing and managing the encryption key information in an encryption key database;
   collecting encrypted traffic from traffic in the hybrid IPv4/IPv6 networks,
   wherein the encrypted traffic flows from at least a first network lead-in point to a second lead-in point,
   wherein each of the first and second network lead-in points is located between a IPv4 network and a IPv6 network, and the first and second network lead-in points communicate through one of the IPv4 network and the IPv6 network,
   wherein the encrypted traffic has an IPsec header of an end-to-end tunnel mode traffic that flows into the hybrid IPv4/IPv6 networks, and
   wherein traffic flows from a first computer user terminal through the first lead-in point to the second lead-in point that a second computer user terminal is connected to for receiving traffic sent from the first computer user terminal, and
   wherein harmful traffic is sent from a third computer user terminal, which is directly connected to the IPv4 network;
   searching for an encryption key used to decrypt the encrypted traffic from the encryption key database using a source IP address and a destination IP address of the encrypted traffic;
   decrypting the encrypted traffic using the encryption key and determining whether the decrypted traffic is harmful traffic; and
   if the decrypted traffic is determined to be the harmful traffic, blocking the harmful traffic and, if the decrypted traffic is determined to be normal traffic, encrypting the normal traffic, and transferring the encrypted traffic to the second computer user terminal corresponding to the destination IP address of the traffic being sent from the first computer user terminal,
   wherein blocked harmful traffic is revoked at the second lead-in point or the first lead-in point from being encrypted to the normal traffic after the traffic from the first computer user terminal has passed through either the first lead-in point or the second lead-in point, and
   wherein the revoked harmful traffic is not transferred as encrypted traffic to the second computer user terminal corresponding to the destination IP address of the traffic being sent from the first computer user terminal.

5. The method of claim 4, wherein the collected encrypted traffic from the traffic in the hybrid IPv4/IPv6 networks is encrypted for use in the end-to-end tunnel mode traffic.

6. A non-transitory computer readable medium having embodied thereon a computer program for a method of coping with encrypted harmful traffic in hybrid IPv4/IPv6 networks, the method comprising:
   collecting encryption key information from at least one to a plurality of computer user terminals connected to the hybrid IPv4/IPv6 networks, and storing and managing the encryption key information in an encryption key database;
   collecting encrypted traffic from traffic in the hybrid IPv4/IPv6 networks, wherein the encrypted traffic flows from at least a first network lead-in point to a second lead-in point, wherein each of the first and second network lead-in points is located between a IPv4 network and a IPv6 network, and the first and second network lead-in points communicate through one of the IPv4 network and the IPv6 network, wherein the encrypted traffic has an IPsec header of an end-to-end tunnel mode traffic that flows into the hybrid IPv4/IPv6 networks, and wherein traffic flows from a first computer user terminal through the first lead-in point to the second lead-in point that a second computer user terminal is connected to for receiving traffic from the first computer user terminal, and wherein harmful traffic is sent from a third computer user terminal, which is directly connected to the IPv4 network;

searching for an encryption key used to decrypt the encrypted traffic from the encryption key database using a source IP address and a destination IP address of the encrypted traffic;

decrypting the encrypted traffic using the encryption key and determining whether the decrypted traffic is harmful traffic; and if the decrypted traffic is determined to be the harmful traffic, blocking the harmful traffic and, if the decrypted traffic is determined to be normal traffic, encrypting the normal traffic, and transferring the encrypted traffic to the second computer user terminal corresponding to the destination IP address of the traffic being sent from the first computer user terminal, wherein blocked harmful traffic is revoked at the second lead-in point or the first lead-in point from being encrypted to the normal traffic after the traffic from the first computer user terminal has passed through either the first lead-in point or the second lead-in point, and wherein the revoked harmful traffic is not transferred as encrypted traffic to the second computer user terminal corresponding to the destination IP address of the traffic being sent from the first computer user terminal.

\* \* \* \* \*